(12) United States Patent
Bhatt et al.

(10) Patent No.: US 8,275,742 B2
(45) Date of Patent: Sep. 25, 2012

(54) DATA IMPORTATION AND EXPORTATION FOR COMPUTING DEVICES

(75) Inventors: Ankur Bhatt, Bangalore (IN); Raghunandan Sarangarajan, Bangalore (IN)

(73) Assignee: Sap Aktiengesellschaft, Walldorf (DE)

( * ) Notice: Subject to any disclaimer, the term of this patent is extended or adjusted under 35 U.S.C. 154(b) by 1548 days.

(21) Appl. No.: 10/699,170

(22) Filed: Oct. 31, 2003

(65) Prior Publication Data

US 2004/0236796 A1   Nov. 25, 2004

Related U.S. Application Data

(60) Provisional application No. 60/471,687, filed on May 19, 2003.

(51) Int. Cl.
*G06F 7/00* (2006.01)
*G06F 17/00* (2006.01)
*G06F 17/30* (2006.01)

(52) U.S. Cl. ..... 707/610; 707/759; 707/807; 707/999.1; 707/999.01

(58) Field of Classification Search .................. 710/100; 707/4, 610, 759, 807, 999.1, 999.01; 715/780
See application file for complete search history.

(56) References Cited

U.S. PATENT DOCUMENTS

| | | | |
|---|---|---|---|
| 5,392,390 A | 2/1995 | Crozier | |
| 5,423,033 A * | 6/1995 | Yuen | 707/4 |
| 5,894,311 A | 4/1999 | Jackson | |
| 5,897,642 A | 4/1999 | Capossela et al. | |
| 5,963,955 A | 10/1999 | Melahn et al. | |
| 6,332,163 B1 | 12/2001 | Bowman-Amuah | |
| 6,615,253 B1 | 9/2003 | Bowman-Amuah | |
| 6,671,757 B1 * | 12/2003 | Multer et al. | 710/100 |
| 6,768,994 B1 * | 7/2004 | Howard et al. | 707/10 |
| 6,901,403 B1 | 5/2005 | Bata et al. | |
| 6,948,133 B2 * | 9/2005 | Haley | 715/780 |
| 2003/0023670 A1 | 1/2003 | Walrath | |
| 2003/0046209 A1 | 3/2003 | Brandenberger et al. | |

(Continued)

FOREIGN PATENT DOCUMENTS

CA   2151654   12/1996

(Continued)

OTHER PUBLICATIONS

"Winzip," *Nico Mak Computing, Inc.*, 1995, pp. 1-106.

(Continued)

*Primary Examiner* — Paul Kim
(74) *Attorney, Agent, or Firm* — Fish & Richardson P.C.

(57) ABSTRACT

A system is disclosed that allows users of computing devices to control the copying of business information between computing systems and various computing environments. The system includes a method for accessing at least one data element from a source database of a source system. The at least one data element may represent a delta change in data existing in a first collection of data stored in the source database. The method includes copying the at least one data element to an export data file and transporting the export data file to a target system. Once transported, the method further includes displaying a user interface on the target system that identifies ones of the at least one data elements that exist in a second collection of data stored in the target database, prompting user selection of desired ones of the at least one data element to be copied in the target database, and copying selected one of the at least one data element to the target database in response to the prompt.

13 Claims, 8 Drawing Sheets

U.S. PATENT DOCUMENTS

| | | |
|---|---|---|
| 2003/0126136 A1 | 7/2003 | Omoigui |
| 2005/0080757 A1 | 4/2005 | Sharma et al. |

FOREIGN PATENT DOCUMENTS

| | | |
|---|---|---|
| WO | 01/98951 | 12/2001 |
| WO | 03/009071 | 1/2003 |

OTHER PUBLICATIONS http://www.pcmag.com/article2/0,4149,101168,00.asp—Brown et al., "How to Print From A PDA," Dec. 5, 2000, 6 pages.

http://www.pcmag.com/article2/0,4149,193754,00.asp—Brown et al., "Quick PDA Data Exchange," May 22, 2001, 6 pages.

http://www.news.com.com/2100-1033-861812.html—Charny, "Data, Downloads and Microsoft," document stated to be last modified Mar. 18, 2002. 4 pages.

http://www.carchip.co.uk/downloads/dr_palm_download.pdf—"Palm Download Kit Installation Instructions," Printed from the Internet Oct. 20, 2003, 9 pages.

http://www.sfatek.com/cus.htm—"FAQ page," Printed from the Internet on Oct. 20, 2003, 5 pages.

Help menus for export operation in Microsoft® Outlook® 2000 SR-1 (9.0.0.3821), 7 pages.

Help menus for field copy operation in Microsoft® Outlook® 2000 SR-1 (9.0.0.3821), 6 pages.

"Utilizing OLE in Office XP/2000" *Create for Mississippi*, retrieved from the Internet on Oct. 14, 2004 at http://www.create.cett.msstate.edu/create/howto/ole.pdf>, document dated Aug. 2001, 7 pages.

"StarOffice™ 6.0 Office Suite", *Sun Microsystems*, retrieved from the Internet on Oct. 14, 2004 at http://www.sun.com/products-n-solutions/edu/success/pdf/Star_Office_6.0.pdf>, document undated, 6 pages.

"Diagra™ Graphics Server" *ReportLab Europe Ltd.*, retrieved from the Internet on Oct. 14, 2004 at http://www.reportlab.com/docs/diagra-ds.pdf>, document dated Jan. 2003, 5 pages.

Agarwal, A., "On the Scalability of Data Synchronization Protocols for PDAs and Mobile Devices," IEEE Network, Jul./Aug. 2002, 7 pages.

Summons to Attend Oral Procedings issued in European Application No. 04733534.4, mailed May 17, 2020, 12 pages.

\* cited by examiner

DATA IMPORTATION AND EXPORTATION FOR COMPUTING DEVICES

CROSS-REFERENCE TO RELATED APPLICATIONS

This application claims the benefit of U.S. Provisional Patent Application Ser. No. 60/471,687, filed on May 19, 2003.

TECHNICAL FIELD

This disclosure relates to transporting data to and from computing devices.

BACKGROUND

Users in the field are increasingly using mobile computing devices (e.g., laptop computers, personal digital assistants ('PDAs'), personal organizers) to identify opportunities and to assist in their work. Generally, mobile computing devices store information on a local database, which is updated periodically by users during their work activities. Typically, information stored on these local databases is updated from a central database that is stored on a different system. The types of information stored on the central database may include, for example, sales contracts, service agreements, and product information that may be of value to the user in the field. In some instances, users of these mobile devices may require that subsets of the central database be copied to their mobile devices and be accessible in the field. However, the copying of these subsets may cause certain problems. For example, the mobile device user may have changed or added additional information (e.g., added notes regarding a particular customer or notes regarding a particular product) to the local database stored on the mobile device while in the field. The user may require essential updates from the central database and yet not want this customized information deleted or overwritten during the update process.

Similarly, software vendors periodically update their software programs and databases of information and send these updates to their customers. Customers also may have spent considerable amounts of time customizing software programs and database information on their mobile devices. Both software vendors and customers require the software vendor updates and yet customers may not want their customizations on the mobile device local database to be deleted or overwritten by the update process.

SUMMARY

A system is disclosed that allows users of computing devices to control the copying of business information between computing systems and various computing environments.

For example, according to one aspect, a method includes accessing at least one data element from a source database of a source system. The at least one data element may represent a delta change in data existing in a first collection of data stored in the source database. The method includes copying the at least one data element to an export data file and transporting the export data file to a target system. Once transported, the method further includes displaying a user interface on the target system that identifies ones of the at least one data elements that exist in a second collection of data stored in the target database, prompting user selection of desired ones of the at least one data element to be copied in the target database, and copying selected ones of the at least one data element to the target database in response to the prompt.

In some embodiments, the method also may include copying a related data element from the source database to the export data file, the related data element relating to the at least one data element, copying the related data element from the export data file to the target database, and generating a restorable archive file using the ones of the at least one data element that exist in the second collection of data stored in the target database. In another aspect, an article is provided that comprises a machine-readable medium storing machine-readable instructions that, when applied to the machine, cause the machine to perform the above-described method. In various embodiments, the machine may also perform additional functions as described previously.

In yet another aspect, a system is provided that includes a computer network, a source system storing a first collection of data in a source database, a target system storing a second collection of data in a target database, and a service delivery device. The source system, target system, and service delivery device are each coupled to the network. The service delivery device includes a processor and memory storage instructions that, in response to receiving a first type of request for access to a service, cause the processor to perform the following functions. First, the processor accesses at least one data element from the source database of the source system. The at least one data element may represent a delta change in data existing in the first collection of data stored in the source database. Next, the processor copies the at least one data element to an export data file and then transports the export data file to the target system.

The service delivery device also, in response to receiving a second type of request for access to a service, causes the processor to perform the following functions. First, display a user interface on the target system that identifies ones of the at least one data elements that exist in the second collection of data stored in the target database and prompt user selection of desired ones of the at least one data element to be copied in the target database. Next, the processor copies selected one of the at least one data element to the target database. In various embodiments, the processor may perform additional functions as previously discussed.

The methods, articles and systems offer one or more of the following advantages. For example, the system may be used to upload or download design reports, document layouts, charts, and business information entered by users or accessed by users using computing devices in a seamless fashion. Another benefit of the system may relate to the customization of data elements. For example, a user may make certain changes to data on a mobile computing device and want to propagate those changes across other computing devices and landscapes that include a development, test, and production computer environment. The propagation of data changes may be easily supported by the disclosure.

The details of one or more embodiments of the disclosure are set forth in the accompanying drawings and the description described below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
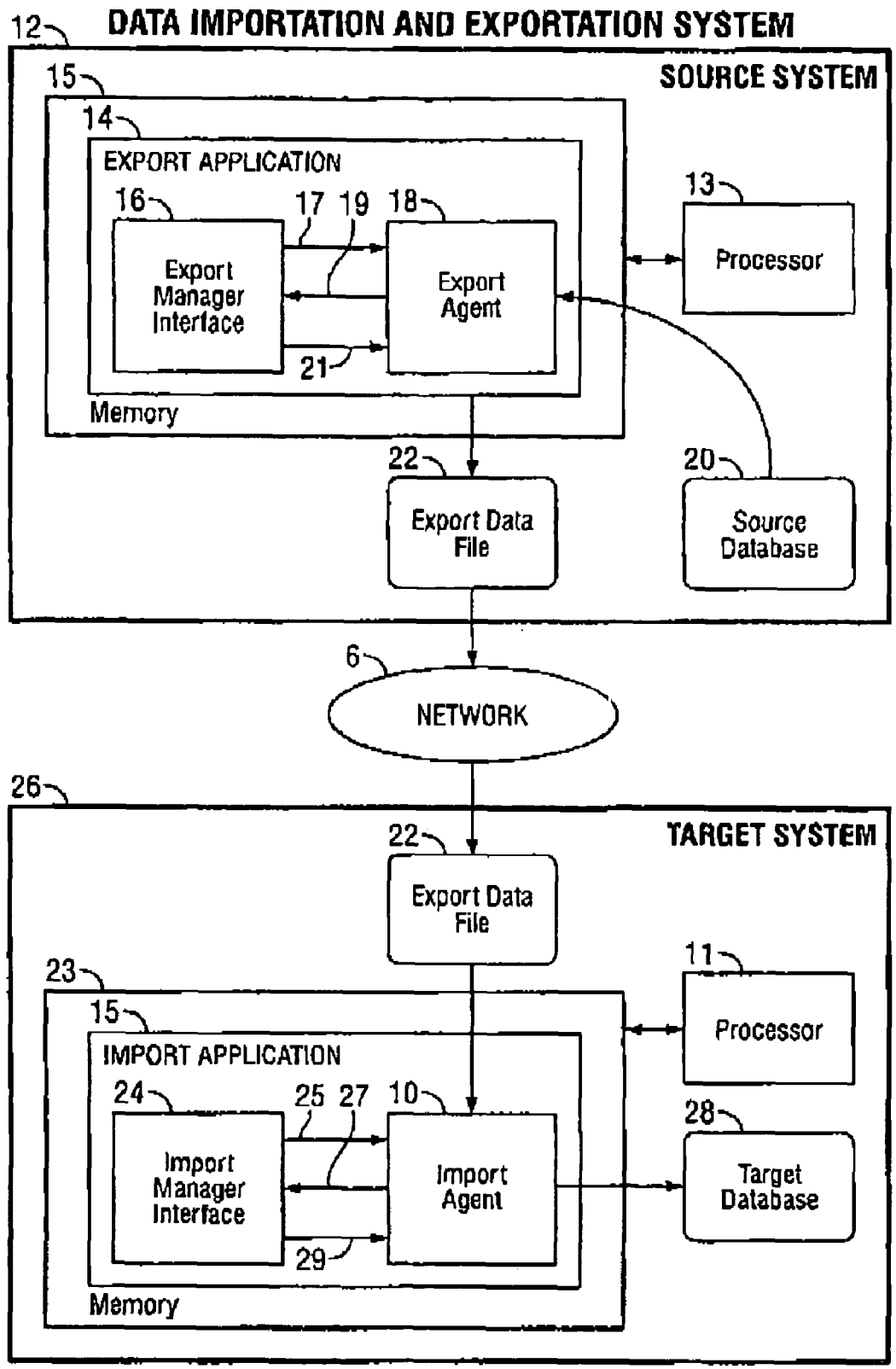
FIG. 1 is a block diagram of a source system and target system capable of copying data from a source database to a target database.

FIG. 1 discloses a system for copying data elements (e.g., contact information, document layouts, charts, and reports) and related data elements (e.g., business opportunities, report layout text elements, report layout logic), collectively 'data items', from a source database of a source system to a target database of a target system by a user.

Source system 12 may serve as a starting location for the movement of data items stored in a source database 20 to a target database 28. Source system 12 may be any type of computing device that includes, for example, a processor 13, memory 15, an export application 14, and source database 20. In some embodiments, for example, source system 12 may be a laptop computer, a personal organizer, or a personal digital assistant ('PDA') that includes a processor and a local storage medium.

Source database 20 provides storage for one or more data items and may be used in operation of source system 12. In one embodiment, referring to FIG. 1, source database 20 is a relational database that provides storage for data items. In another embodiment, source database 20 may be a directory server, such as a Lightweight Directory Access Protocol (LDAP) server, that provides storage for data items. In other embodiments, source database 20 may be a configured area in memory of source system 12 and store data items.

Referring to FIG. 1, export application 14 of source system 12 provides one or more software modules that are configured to copy data items from source database 20 to an export data file 22. In one embodiment, as illustrated in FIG. 1, export application 14 includes an export manager interface 16 and an export agent 18. In other embodiments, for example, source computer system 12 may include a plurality of computer environments that include a development environment and a production environment. Export application 14 may be configured with software modules that provide for the copying of data items to and from development and production environments.

Figure 2:
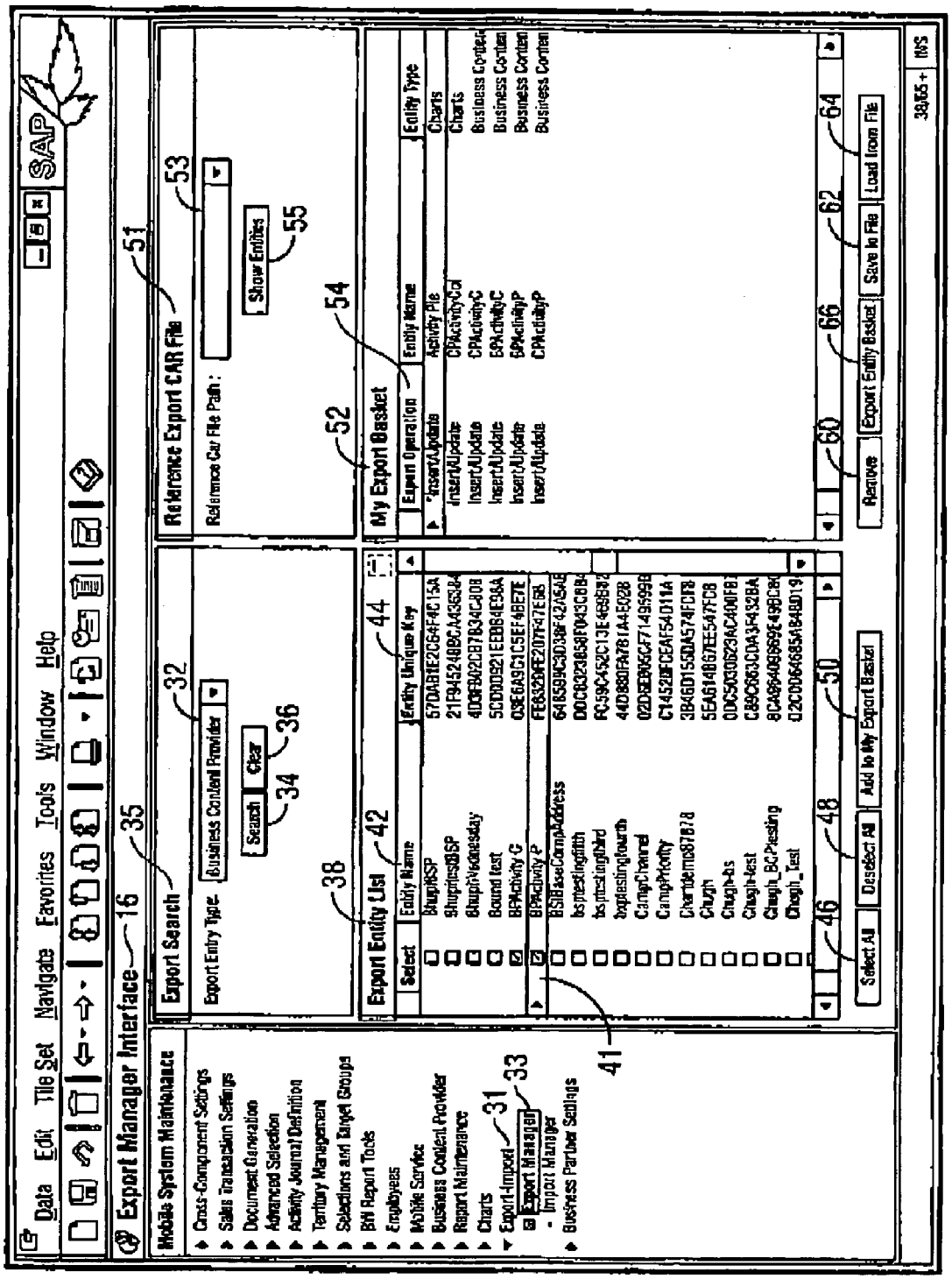
FIG. 2 is a diagram of an example of a graphical user interface for initiating copying of data stored in a source database to an export file.

Export manager interface 16 provides a graphical user interface that may display to users available data items for copying from source database 20. In one embodiment, as illustrated in FIG. 1, export manager interface 16 may communicate with export agent 18 and request a listing of available data elements that may be copied. Upon user selection of data elements, export manager interface 16 also may request export agent 18 to copy user selected data elements from source database 20 to export data file 22. One embodiment of export manager interface 16 is illustrated in FIG. 2.

Referring to FIG. 1, export agent 18 provides a listing of data items available for copying to export data file 22 and executes copying of user-selected data items from source database 20 to export data file 22. As illustrated in FIG. 1, for example, export agent 18 receives a listing request 17 from export manager interface 16. Upon receiving the listing request 17, export agent 18 queries source database 20 for data items and provides a result list 19 for display by export manager interface 16.

Figure 3:
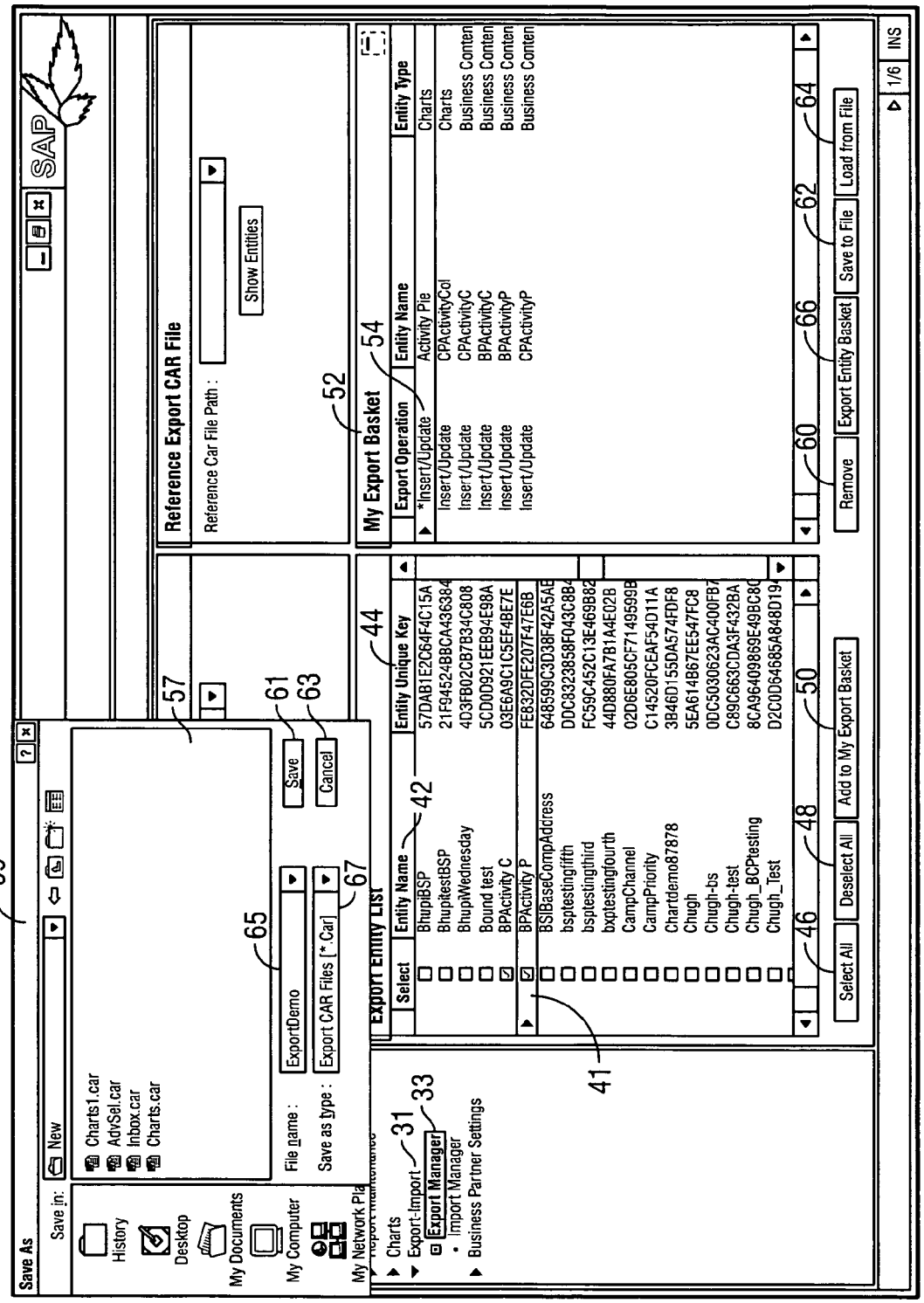
FIG. 3 is a diagram of an example of a graphical user interface for naming an export file.

Export agent 18 also executes a method for copying data items from source database 20 and generates export data file 22. As illustrated in FIG. 1, export agent 18 generates export data file 22 upon receiving a copy request 21 from export manager interface 16. The method for copying data elements from source database 20 and the generation of export data file 22 is illustrated in FIG. 3.

In one embodiment, referring to FIG. 1, network 6 provides electronic connectivity to transport export data file 22 from source system 12 to target system 26. Various types of network topologies and data communication facilities may be supported by network 6. In some embodiments, for example, computer network 6 is landline based. In other embodiments, wireless-based technologies are used for data communication between source system 12 and target system 26. In yet other embodiments, computer network 6 may transfer information between source system 12 and target system 26 using a serial connection, a universal serial bus ('USB') connection, or storage mediums (e.g., floppy disks, tape, compact disks).

Referring to FIG. 1, target system 26 is provided and serves as a destination location for export data file 22. Similar to source system 12, target system 26 may be a computing device that includes a processor 11 and memory 23. For example, in some embodiments, target system 26 may be another mobile computing device, personal computer ('PC'), or a server-based computing system storing a target database. As illustrated in FIG. 1, target system 26 is configured to connect to computer network 6 and to receive export data file 22. In other embodiments, target system 26 can receive export data file 22 from an external storage medium (e.g., a floppy disk, tape, or compact disk). Target system 26 includes an import application 15 and a target database 28.

Target database 28 provides a storage area for data items that may be copied from export data file 22. In one embodiment, for example, target database 28 is a relational database that stores information on target system 26. In other embodiments, target database 28 may be a directory server, such as a Lightweight Directory Access Protocol (LDAP) server, accessible to target system 26. In yet other embodiments, target database 28 may be a configured area in memory of target system 26 that may store and data items.

As shown in FIG. 1, import application 15 is provided and includes software modules configured to copy data elements from export data file 22 to target database 28. In one embodiment, for example, import application 15 may include an import manager interface 24 and an import agent 10. Similar to export application 14, import application 15 may include other software components. For example, in some embodiments, import application 15 also may include export manager interface 16 and export agent 18 to copy data elements from a source database residing on target system 26.

Figure 4:
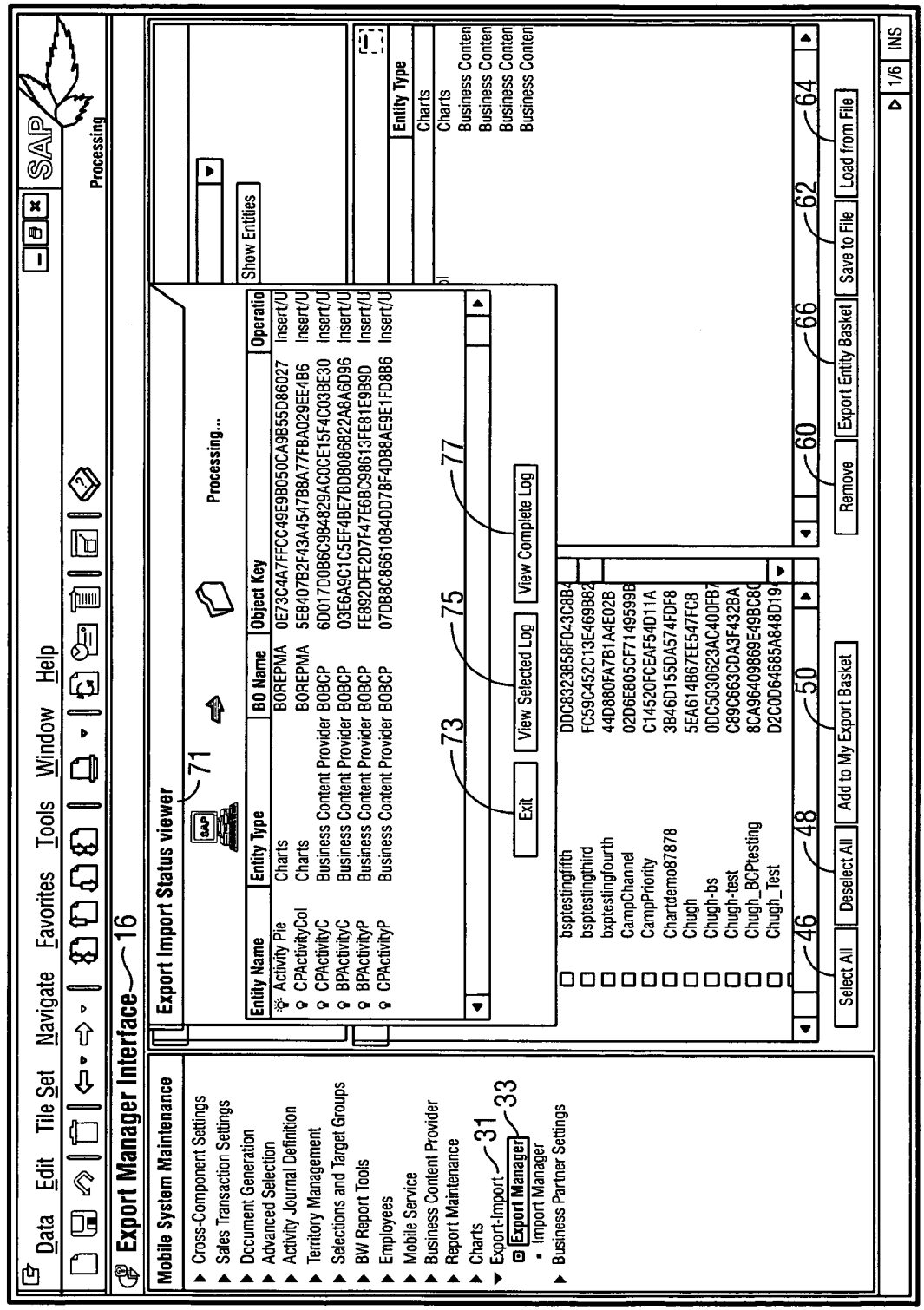
FIG. 4 is a diagram of an example of a graphical user interface for displaying copy status information during copying of data to an export file.

Import manager interface 24 provides a graphical user interface that displays data elements stored in export data file 22. In one embodiment, as illustrated in FIG. 1, import manager interface 24 may communicate with import agent 10 and request a listing of available data elements stored in export data file 22 based on user input for display to a user. Upon user selection of data elements, import manager interface 24 may communicate a request to import agent 10 to copy user selected data elements to target database 28. One embodiment of import manager interface 26 is illustrated in FIG. 4.

In one embodiment, referring to FIG. 1, import agent 10 also provides a listing of data elements stored in export data file 22 to import manager interface 24 for display to a user and executes copying of data elements stored in export data file 22 to target database 28. In this embodiment, import agent 10 receives a listing request 25 from import manager interface 24 that includes a directory path location of export data file 22. Upon receiving the listing request, import agent 10 identifies data items stored in export data file 22 and provides a result list 27 to import manager interface 24 for display to a user.

Import agent 10 also provides copying of data items to target database 28. Referring to FIG. 1, for example, import agent 10 receives a copy request 29 from import manager interface 24 based on user input and copies user selected data items from export data file 22 to target database 28. The methodology for copying data elements from export data file 22 to target database 28 is described in FIG. 5.

Referring to FIG. 2, one embodiment of export manager interface 16 is illustrated. As illustrated in FIG. 2, export manager interface 16 may be integrated into a larger application framework by first selecting an export-import pulldown menu option 31 and then selecting export manager menu option 33. In other embodiments, export manager interface 16 may be utilized as a stand-alone application.

Export manager interface 16 includes a search display area 35, an entity list 38, a reference export file area 51, and an entity basket 52. Search display area 35 provides a user with the ability to search for data items that may be stored in source database 20. Search display area 35 also includes an option list 32 that provides one or more categories (e.g., reports, business cases, pull down menu options) that data items may be classified in. In one embodiment, for example, the classification of data item types may be established at data item creation time. In other embodiments, classification of data item types may be established after data item creation.

Referring to FIGS. 1 and 2, in one embodiment, upon selection from option list 32 and selection of search button 34, export manager interface 16 sends listing request 17 to export agent 18 for processing. Export agent 18 then queries source database 20 for data items that match the option list 32 selection and provides result list 19 to export manager interface 16. In another embodiment, export manager interface 16 may directly query source database 20 using option list 32 selections. As illustrated in FIG. 2, upon query execution, export manager interface 16 then displays a user selectable result list 19 in entity list 38. Clear button 36 also may be provided as part of export manager interface 16 and, upon user selection, removes a result list displayed in export entity list 38.

As illustrated in FIG. 2, entity list 38 graphically displays a user selectable listing of data items that results from selection of search button 34. In one embodiment, illustrated in FIG. 2, entity list 38 also provides for each data item displayed, a user select option 41 that tags individual data items as candidates to be copied to entity basket 52. Entity list 38 also displays one or more data item attributes, such as a data item name 42 and a unique key 44 that can be used as an identifier to locate a particular data item in source database 20.

Entity list 38 also provides several command buttons that affect data items displayed in entity list 38. As shown in FIG. 2, for example, a select button 46 is provided that once selected, tags all displayed data items in entity list 38 as candidates to be copied to entity basket 52. A deselect button 48 also is provided that once selected by the user, removes tags from all data items displayed in entity list 38. An "add to my export basket" button 50 also is provided that transfers tagged data items from entity list 38 to entity basket 52.

As shown in FIG. 2, export manager interface 16 includes a reference export file area 51. Reference export file area 51 provides an area where a user can identify a previously exported data file. Reference export file area 51 includes a reference data file selection option 53 that allows a user to select a previously exported data file and a "show entities" button 55 that allows a user to view a listing of data items stored in a previously exported data file. In one embodiment, for example, data items stored in an exported data file may be used in a method for copying data items from a source database to a target system.

Entity basket 52 provides a final staging area for copying tagged data items to export data file 22. As shown in FIG. 2, entity basket 52 provides a copy operation pulldown menu 54 that allows a user to specify an action (e.g., insert, update) to be executed for a tagged data item upon copying to target database 28. For example, if an 'insert' action is specified for a tagged data item and the tagged data item already exists in target database 28, upon copying, the data item existing in target database 28 may be overwritten with the tagged data item. If the 'update' action is selected and the tagged data item exists in target database 28, the existing data item in target database 28 may be augmented or modified by the data item stored in export data file 22.

As illustrated in FIG. 2, entity basket 52 also provides a remove button 60 that, once selected by the user, deletes data items displayed in entity basket 52, a save button 62 that, once selected by the user, creates a local text file that stores data items displayed in entity basket 52, and a load button 64 that once selected by the user, displays the contents of the local text file created by save button 62 in entity basket 52. One advantage of providing save button 62 and load button 64 may be that, once data items are copied to entity basket 52, a user may postpone additional processing until a future time and not be required to access search display area 35 and entity list 38 again to retrieve data items. Export button 66 also is provided and, once selected by the user, initiates generation of export data file 22.

In one embodiment, when the "export entity basket" button 66 is selected, the "save as" dialog box 59, shown in FIG. 3, is displayed in front of the export manager interface 16. As shown in FIG. 3, "save as" dialog box 59 includes a display export data file area 57 that lists previously saved export data files, a file name data entry field 65 that allows a user to specify a name for export data file 22, and a file-type pull down menu option 67 that allows a user to specify the file format to be used for export data file 22. "Save as" dialog box 59 also includes a save button 61 that, once selected, executes a method for copying data items to export data file 22 and a cancel button 63 that once selected, closes the "save as" dialog box 59 display. Upon selection of save button 61 of "save as" dialog box 59, the "save as" dialog box is closed and a status viewer screen 71 is displayed shown in FIG. 4. Status viewer screen 71 displays status information relating to execution of the copy method for each data item contained in export basket 52. In some embodiments, status viewer screen 71 may display status information for a data item in color. For example, a data item having the color white may indicate a status of "TO BE PROCESSED", a data item having the color of yellow may indicate "IN PROCESS", a data item having the color of red may indicate that an "ERROR" occurred during copying and a data item having the color of green may indicate "COPY SUCCESSFUL".

Status viewer screen 71 includes a "view selected log" button 75 that allows a user to view the status of data items by entity type (e.g., chart, report, etc.), a "view complete log" button 77 that allows a user to view all data items that are to be copied, and an "exit" button 73 that closes status viewer screen 71.

Referring back to FIG. 1, for example, the generation of export data file 22 is based on export manager interface 16 sending a copy request 21 to export agent 18 based on user selection of export button 66. In other embodiments, however, selection of export button 66 may generate a local entity basket text file, the existence of which may initiate an already executing export agent 18 to generate export data file 22.

Figure 5:
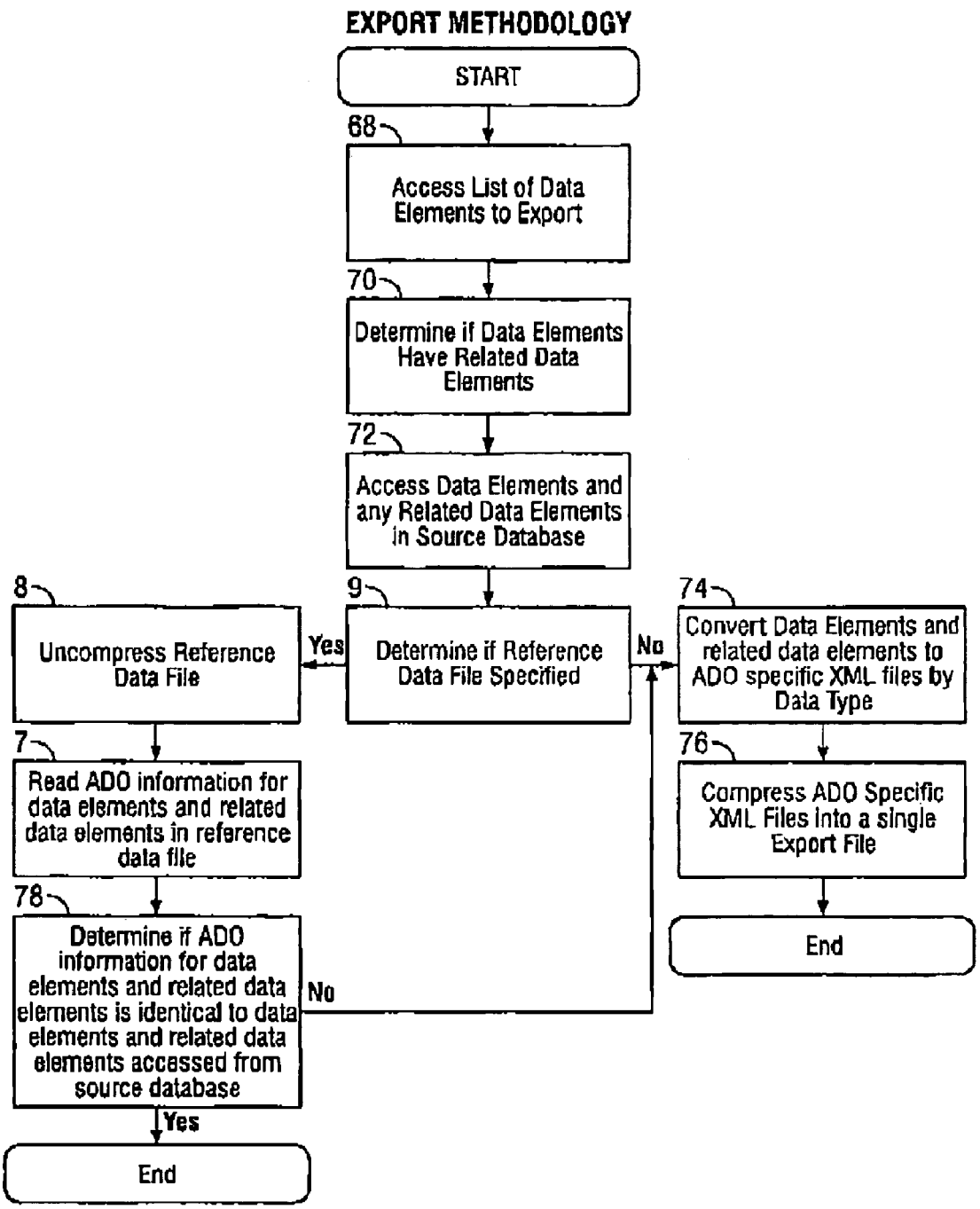
FIG. 5 is a flowchart of an example of a method that may be executed to generate an export file.

Referring now to FIG. 5, in one embodiment, export agent 18 may execute the following method for copying data items to export data file 22 for transfer to target system 26. First, export agent 18 accesses the list of tagged data items to be copied to a database 68 located on a target system. As described earlier, in some embodiments, tagged data items may be included in copy request 21 generated by export manager interface 16. In other embodiments, for example, export agent 18 may access a local entity basket file to retrieve data items for copying. Next, once accessed, export agent 18 determines whether a particular tagged data item has any related data elements 70. In some embodiments, for example, a data element, such as a report, may have related text elements that include report headings, column headings, as well as embedded logic that determines the manner in which a particular aspect of the data item is to be displayed (e.g. font type and size, numeric decimal format). Next, data elements and any related data elements are accessed 72 from source database 20. Next, a determination is made whether a reference export file is specified 9. In the event a reference export file is not specified, export agent 18 then converts data elements and related data elements to ActiveX Data Object ('ADO') specific extensible markup language ('XML') files by data item type 74. Once all of the ADO specific XML files are generated, export agent 18 then compresses all XML files 76 into export data file 22 using commercially available compression algorithms. If a reference export file is specified 9, export agent then decompresses reference export file 8 using commercially available decompression algorithms. Next, export agent 18 then reads ADO information 7 for data elements and data elements stored in the reference export file. Next, export agent 18 determines if the ADO information for data elements and related data elements is identical to the ADO information for data elements and related data elements accessed 78 from source database. If the ADO information read from the reference export data file is not identical, then export agent converts the data elements and related data elements accessed from source database to ADO specific extensible markup language ('XML') files by data item type 74. Once all of the ADO specific XML files are generated, export agent 18 then compresses all XML files 76 into export data file 22 using commercially available compression algorithms.

Figure 6:
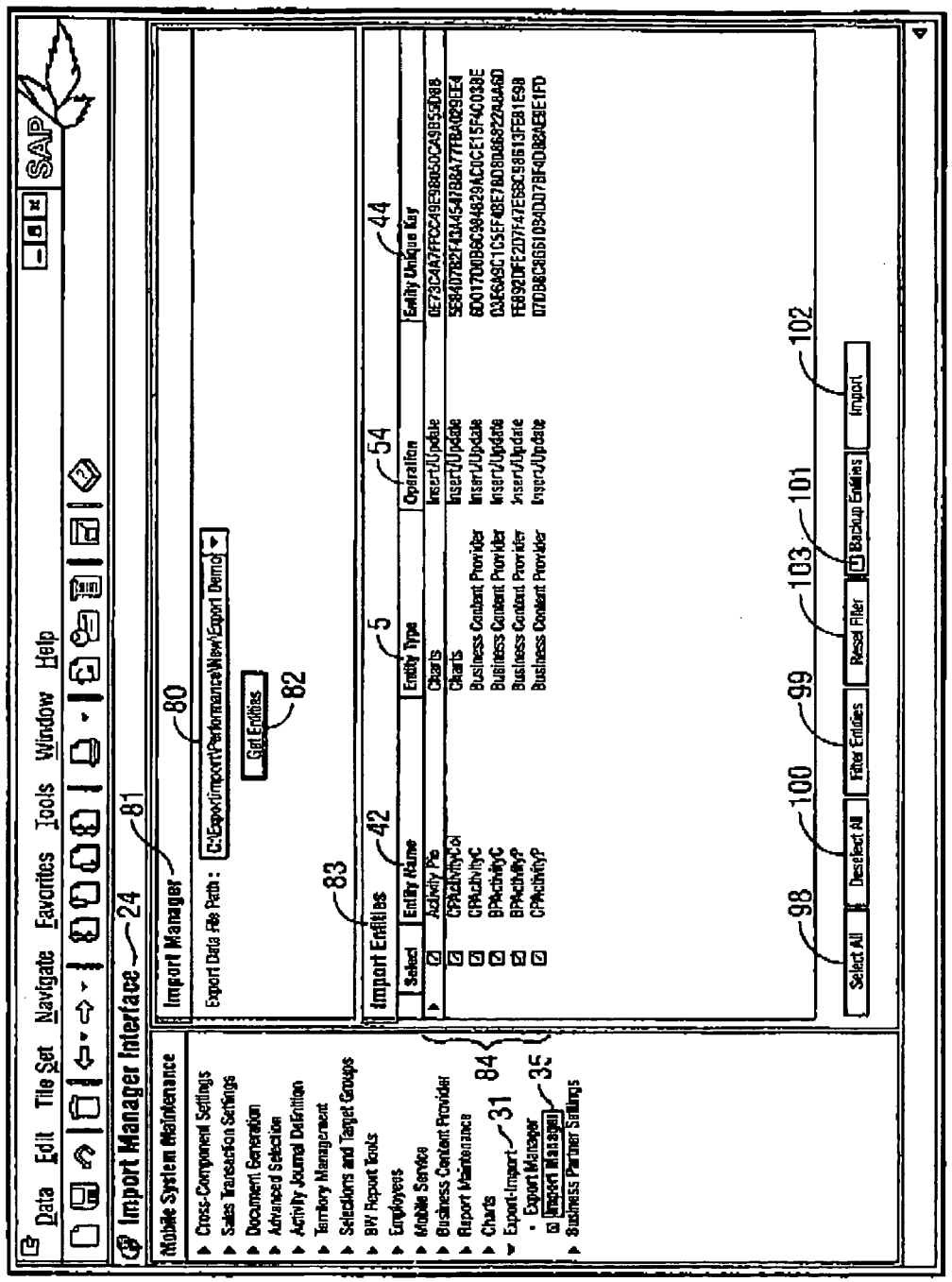
FIG. 6 is a diagram of an example of a graphical user interface for initiating copying of data stored in an export file to a target database.

Referring to FIG. 6, one embodiment of the import manager interface 24 is illustrated. Import manager interface 24 provides a graphical user interface that allows a user to selectively control the copying of data items stored in export data file 22 to target database 28. In one embodiment, as illustrated in FIG. 6, import manager interface is integrated into a larger application framework and is accessible by first selecting export-import-pulldown menu option 31 and then selecting import manager option 35. In other embodiments, import manager interface 24 may be utilized as a stand-alone application.

As illustrated in FIG. 6, import manager interface 24 includes an import manager display area 81 and an import entities display area 83. Import manager display area 81 includes an import-data-file-path menu option 80 that may be selected by the user to specify a directory location of export data file 22 on target system 26. In other embodiments, import manager display area 81 may include a browser to locate export data file 22 on target system 26.

As illustrated in FIG. 6, import manager display area 81 also includes a "get entities" button 82. Upon selection of "get entities" button 82 by the user, import manager interface 24 sends listing request 25 that includes the location specified by the user in import-data-file-path menu option 80 to import agent 10 for processing. Import agent 10 then queries export data file 22 and target database 28 and provides import manager interface 24 with result list 27 for display to the user. Import manager interface 24 then displays a user selectable result list in import entity display area 83 and prompts the user for a selection of data items to be copied to target database 28. In other embodiments, import manager interface 24 may display all data items stored in export data file 22 in import entity display area 83 and prompt the user for a data item selection.

Import entity display area 83 displays a user selectable listing 84 of data items. In one embodiment, as illustrated in FIG. 4, each data item displayed in import entity display area 83 has associated with it attributes, such as entity name 42, entity key 44 and the copy operation 54 selected for the data item in entity basket 52.

As shown in FIG. 6, import entity display area 83 also provides a user selectable import setting control for each data item displayed. Import setting control allows a user to control whether related data elements are overwritten or ignored during copying of a data item to target database 28. One advantage of this design may be when a vendor distributes data elements used by vendor supplied software solutions to customers. For example, software vendors periodically update their software and information databases and send these updates to their customers. Customers, however, already may have spent time customizing vendor software and/or information databases used by this software. For example, a customer may have already added a note or modified a report provided by the vendor in some manner. This design provides a customer with control for accepting or denying the copying of update changes received from a vendor's source database where automatic acceptance of such changes may overwrite customized database information stored in a customer's target database.

As illustrated in FIG. 6, import entity display area 83 also provides a "select all" button 98 that once selected by the user, tags all data items displayed in import entity display area 83 as candidates to be copied to target database 28. A "deselect all" button 100 is provided that, once selected by the user, untags all selected items in import entity display area 83. Also provided is a "filter entities" button 99 that, once selected, allows a user to specify entity types 5 to be displayed in user selectable listing 84, a "reset filter" button 103 that, once selected by the user, displays all data items stored in export data file 22, and an "import" button 102 that, once selected by the user, initiates copying of displayed tagged data items in import entity display area 83 to target database 28. Import entity display area 83 also provides a "backup entities" check box 101 that, once selected by the user, serves as an indicator that data items stored in target database 28 that may be modified or deleted as a result of the copy operation are to be first copied to a restorable archive file.

In one embodiment, as illustrated in FIG. 6, the copying of tagged data items displayed in "import entities" display area 83 to target database 28 (FIG. 1) is initiated by user selection of "import" button 102. Upon selection, and referring to FIG. 1, import manager interface 24 sends copy request 29, which includes tagged data items to import agent 10 for processing. In other embodiments, selection of "import" button 102 may generate a local text file containing tagged data items displayed in the import entity display area 83, the existence of the local text file may initiate import agent 10 to copy items to target database 28.

Figure 7:
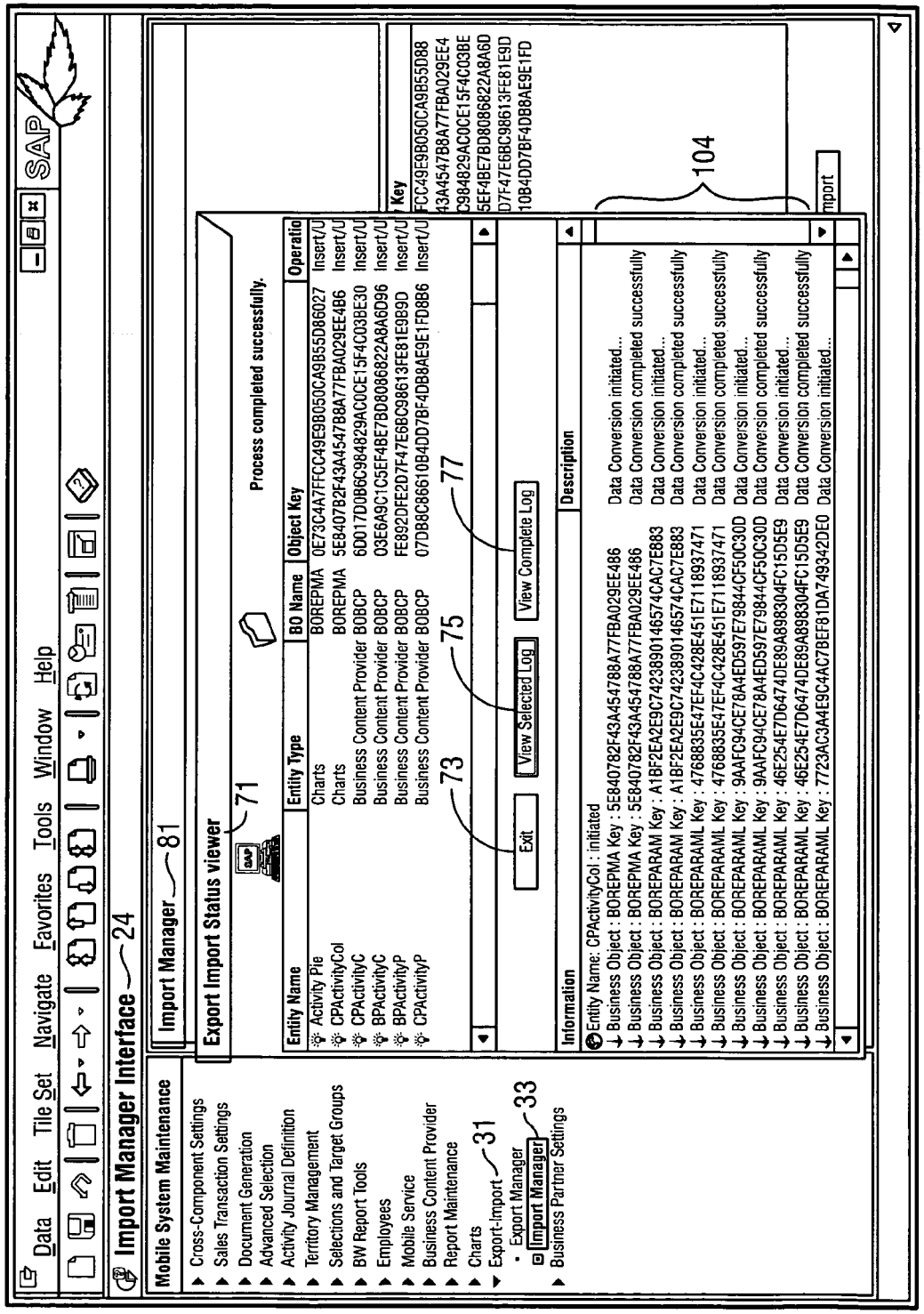
FIG. 7 is a diagram of an example of a graphical user interface for displaying status information during copying of data to a target database.
Figure 8:
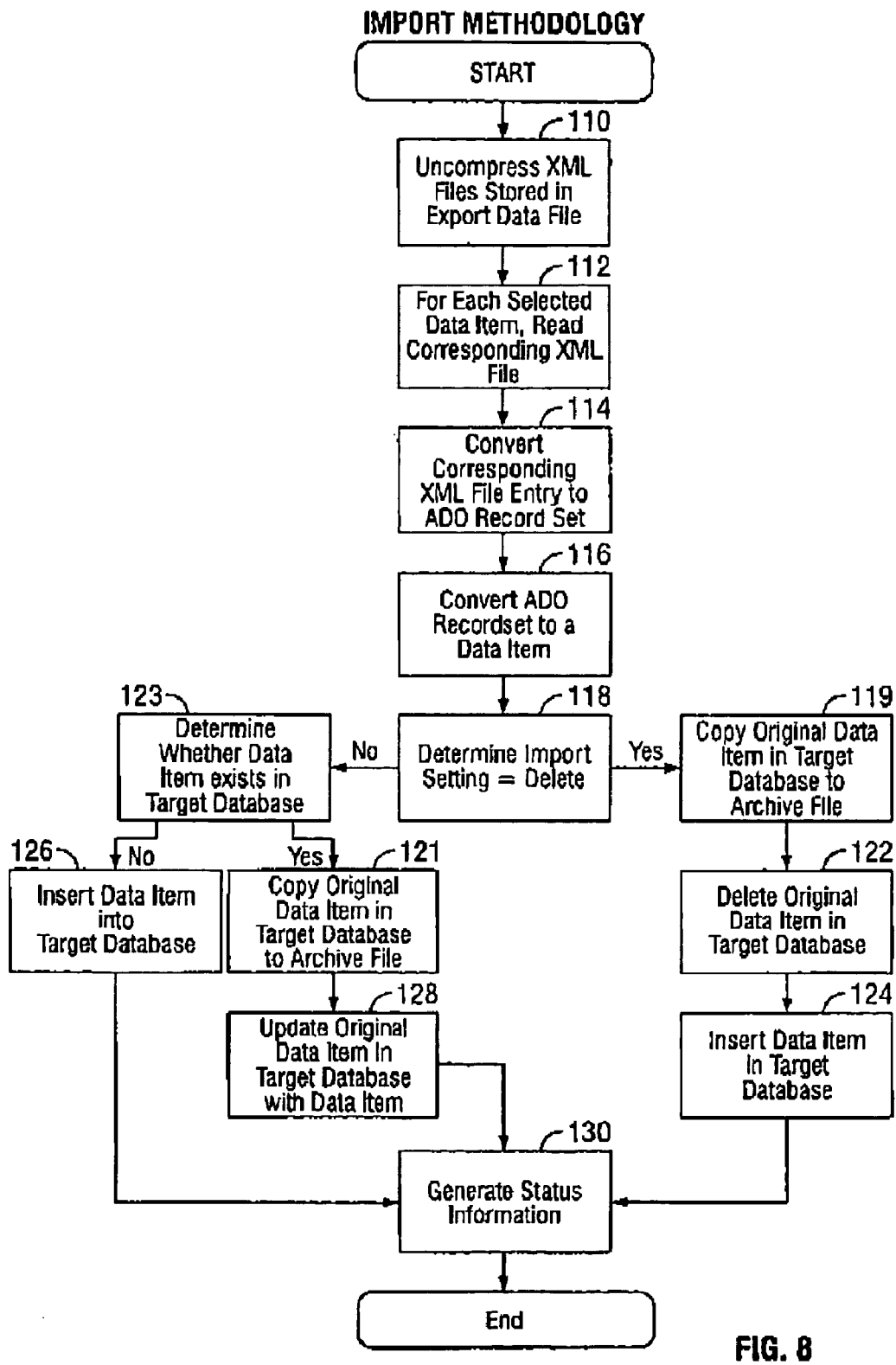
FIG. 8 is a flowchart of an example of a method that may be executed to copy data from an export file to a target database.

In another embodiment, referring to FIG. 7, upon selection of import button 102, status viewer screen 71 is displayed and presents status information relating to execution of the copy method for each data item displayed in import entities display area 83. As illustrated in FIG. 7, status viewer screen 71 includes a "view selected log" button 75 that provides additional detailed status information for data items to be copied to target database 28. As illustrated in FIG. 7, for example, upon selection of data item "CPActivity Col" and "selected log" button 75, detailed information 104 regarding whether the copy operation for data elements and related data elements contained in the data item "CPActivity Col" completed successfully. Referring to FIG. 8, in one embodiment import agent 10 executes the following method to either add or update data items to target database 28. First, import agent 10 decompresses XML files stored in export data file 22 into individual XML files by data item type using commercially available decompression algorithms 110. Next, import agent 10 reads XML files corresponding to data item types selected for copying 112 to target database 28. Next, import agent 10 converts corresponding XML file entries to ADO Recordsets 114 and then converts the ADO Recordsets to a data item 116. Next, import agent 10 then determines the import setting control established for the data item 118. In one embodiment, for example, if the import setting control is set to "delete", import agent 10 copies corresponding existing data items from target database 28 to an archival file 119 that may be used to restore data items to target database 28. Next, import agent 10 deletes the corresponding data item 122 in target database 28 and inserts the new data item 124 converted from the ADO Recordset into target database 28. Lastly, import agent 10 records its execution status in a status file 130.

If import agent 10 determines that the import setting control is not set to "delete", import agent 10 then determines whether the data item converted from the ADO Recordset exists 123 in target database 28. If the data item converted from the ADO Recordset does not exist in target database 28, then import agent 10 inserts the data item 126 into target database 28 and records its execution status in status file 130. If the data item converted from the ADO Recordset does exist in target database 28, import agent 10 copies corresponding existing data items from target database 28 to a restorable archival file 121 and updates corresponding existing data items 128 in target database 28 with the data item converted form the ADO Recordset. Lastly, import agent 10 records its execution status in status file 130.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A method comprising:
accessing at least one data element representing a delta data change from a source database of a source system, the delta data change existing in a first collection of data in the source database;
accessing a related data element from the source database, the related data element defined to have a relationship to the at least one data element and affecting a layout of the at least one data element;
copying the at least one data element and the related data element to an export data file by converting the at least one data element and the related data element to ActiveX Data Object specific extensible markup language files by data type;
transporting the export data file from the source system to a target system having a target database;
displaying, at the target system, a user interface that identifies ones of the at least one data element that exist in a second collection of data stored in the target database, to prompt a user selection of desired ones of the at least one data element to be copied in the target database; and
copying selected ones of the at least one data element and the related data element to the target database.

2. The method of claim 1 wherein copying the at least one data element to the export data file comprises:
comparing the at least one data element to a data element stored in a reference export data file; and
storing the at least one data element to the export data file based on the comparison.

3. The method of claim 1 wherein the at least one data element represents a report and the related data element represents a graphical illustration of data in the report.

4. The method of claim 1 wherein copying to the target database comprises generating a restorable archive file using the ones of the at least one data element that exist in the second collection of data stored in the target database.

5. The method of claim 4 wherein generating the restorable archive file comprises using a related data element to the at least one data element, the related data element existing in the second collection of data stored in the target database.

6. A system comprising:
a computer network;
a source system coupled to the computer network, the source system storing a first collection of data in a source database;
a target system coupled to the computer network, the target system storing a second collection of data in a target database;
a service delivery device coupled to the network, the service delivery device including a processor and memory storing instructions that, in response to receiving a first type of request for access to a service, cause the processor to:
access at least one data element representing a delta data change from the source database of the source system, the delta data change existing in the first collection of data in the source database;
access a related data element from the source database, the related data element defined to have a relationship to the at least one data element and affecting a layout of the at least one data element;

copy the at least one data element and the related data element to an export data file by converting the at least one data element and the related data element to ActiveX Data Object specific extensible markup language files by data type; and transport the export data file from the source system to the target system having the target database;

display, at the target system, a user interface that identifies ones of the at least one data element that exist in the second collection of data stored in the target database, to prompt a user selection of desired ones of the at least one data element to be copied in the target database; and copy selected ones of the at least one data element and the related data element to the target database.

7. The system of claim 6 wherein the memory stores instructions that, in response to receiving the first type of request, cause the processor to:

compare the at least one data element to a data element stored in a reference export data file; and store the at least one data element to the export data file based on the comparison.

8. The system of claim 6 wherein the memory stores instructions that, in response to receiving the second type of request, cause the processor to generate a restorable archive file using the ones of the at least one data element that exist in the second collection of data stored in the target database.

9. The system of claim 8 wherein the memory stores instructions that, in response to receiving the second type of request, cause the processor to generate the restorable archive file using the related data element to the at least one data element, the related data element existing in the second collection of data stored in the target database.

10. An article comprising a machine-readable medium storing machine-readable instructions that, when applied to the machine, cause the machine to:

access at least one data element representing delta data change from a source database of a source system, the delta data change existing in a first collection of data in the source database;

access a related data element from the source database, the related data element defined to have a relationship to the at least one data element and affecting a layout of the at least one data element;

copy the at least one data element and the related data element to an export data file by converting the at least one data element and the related data element to ActiveX Data Object specific extensible markup language files by data type;

transport the export data file from the source system to a target system storing a target database;

display, at the target system, a user interface that identifies ones of the at least one data element that exist in a second collection of data stored in the target database, to prompt a user selection of desired ones of the at least one data element to be copied in the target database; and copy selected ones of the at least one data element and the related data element to the target database.

11. The article of claim 10 including instructions that, when applied to the machine, cause the machine to compare the at least one data element to a data element stored in a reference export data file; and store the at least one data element to the export data file based on the comparison.

12. The article of claim 10 including instructions that, when applied to the machine, cause the machine to generate a restorable archive file using the ones of the at least one data element that exist in the second collection of data stored in the target database.

13. The article of claim 12 including instructions that, when applied to the machine, cause the machine to generate the restorable archive file using a related data element to the at least one data element, the related data element existing in the second collection of data stored in the target database.

* * * * *